United States Patent
Thomas et al.

(10) Patent No.: US 9,921,956 B2
(45) Date of Patent: Mar. 20, 2018

(54) SYSTEM AND METHOD FOR TRACKING BLOCK LEVEL MAPPING OVERHEAD IN A NON-VOLATILE MEMORY

(71) Applicant: SanDisk Technologies LLC, Plano, TX (US)

(72) Inventors: Nicholas James Thomas, Dundee (GB); Oleg Kragel, San Jose, CA (US); Michael Anthony Moser, San Jose, CA (US)

(73) Assignee: SanDisk Technologies LLC, Plano, TX (US)

( * ) Notice: Subject to any disclaimer, the term of this patent is extended or adjusted under 35 U.S.C. 154(b) by 70 days.

(21) Appl. No.: 15/215,271

(22) Filed: Jul. 20, 2016

(65) Prior Publication Data

US 2018/0024920 A1  Jan. 25, 2018

(51) Int. Cl.
*G06F 12/02* (2006.01)

(52) U.S. Cl.
CPC ...... *G06F 12/0246* (2013.01); *G06F 12/0253* (2013.01); *G06F 2212/1044* (2013.01); *G06F 2212/2022* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 8,316,176 B1 * | 11/2012 | Phan | ............... | G06F 12/0246 365/185.33 |
| 8,954,656 B2 | 2/2015 | Thomas | | |
| 2010/0169542 A1 * | 7/2010 | Sinclair | ............... | G06F 12/0246 711/103 |
| 2010/0169588 A1 * | 7/2010 | Sinclair | ............... | G06F 12/0246 711/160 |
| 2011/0016263 A1 * | 1/2011 | Lin | ............... | G11C 29/02 711/103 |
| 2015/0169465 A1 | 6/2015 | Slepon | | |
| 2015/0347026 A1 | 12/2015 | Thomas | | |

* cited by examiner

*Primary Examiner* — Kevin Verbrugge
(74) *Attorney, Agent, or Firm* — Brinks Gilson & Lione

(57) ABSTRACT

A system and method is disclosed for tracking block mapping overhead in a non-volatile memory. The system may include a non-volatile memory having multiple memory blocks and a processor configured to track a block level mapping overhead for closed blocks of the multiple memory blocks. The processor may be configured to track predetermined logical address ranges within which data written to a block fall, and then store the sum of the number of different logical address ranges for each respective block as a block address entropy metric. The method may include the processor using the block address entropy metric to select source blocks for garbage collection with a lower block address entropy metric or to adjust other operational characteristics such as data routing within the non-volatile memory system based on average block address entropy for a group of blocks.

21 Claims, 9 Drawing Sheets

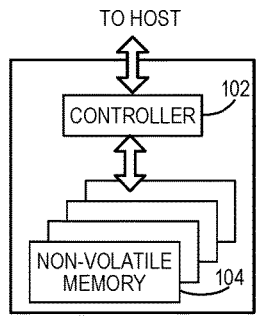
FIG. 1A
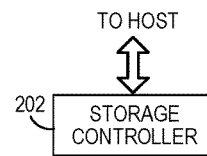
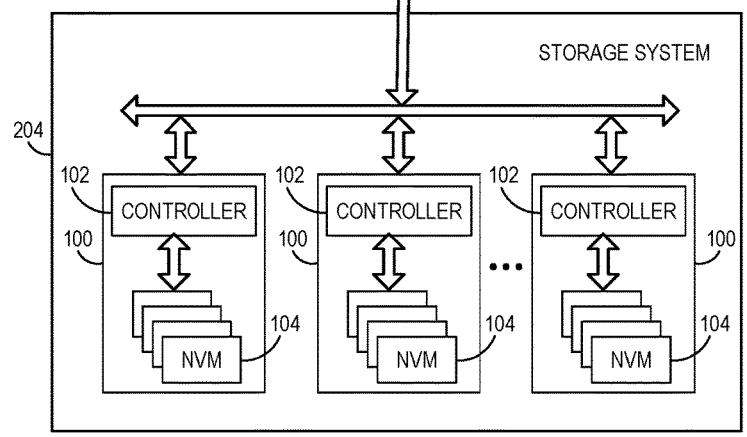
FIG. 1B
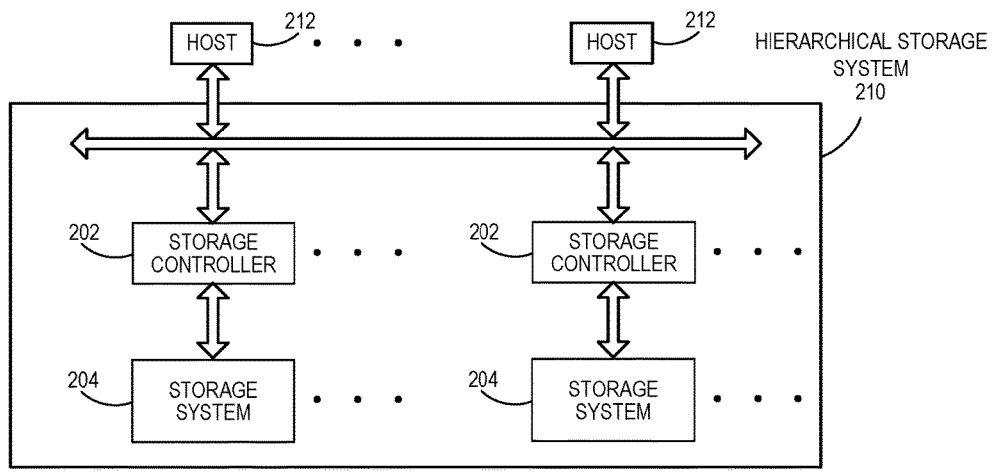
FIG. 1C

SYSTEM AND METHOD FOR TRACKING BLOCK LEVEL MAPPING OVERHEAD IN A NON-VOLATILE MEMORY

BACKGROUND

Storage systems, such as solid state drives (SSDs) including NAND flash memory, are commonly used in electronic systems ranging from consumer products to enterprise-level computer systems. The market for SSDs has increased and its acceptance for use by private enterprises or government agencies to store data is becoming more widespread. SSDs and similar storage devices utilizing block-oriented architectures share a common issue: the need to create space for writing new data by collecting sparsely distributed data into a smaller number of blocks. This process is referred to as "garbage collection". The need for garbage collection in many block-oriented storage devices is generally due to the inability to write in place to memory, and the mismatch between write granularity and erase granularity in those storage device.

The garbage collection process may introduce a significant burden on processing resources which, in turn, may reduce SSD performance. Garbage collection involves reading valid data from a block of non-volatile memory that is to be reused and writing it back to a new block. In many SSDs there is an additional burden to evaluate which data within a source block is valid before writing only the valid back to the new block. This validity check may itself involve reading parts of a mapping table which may be cached in local random access memory (RAM) or held in non-volatile memory, such as flash. Retrieval of a portion of the mapping table from non-volatile memory is significantly more costly in time and therefore can reduce SSD performance (if garbage collection is done in foreground). In certain SSDs, however, the size of the RAM cache available for storing mapping table information may be significantly smaller than the size of the mapping table and thus garbage collection performance may decrease with smaller RAM cache sizes.

BRIEF DESCRIPTION OF THE DRAWINGS

FIG. 1A is a block diagram of an example non-volatile memory system.

FIG. 1B is a block diagram illustrating an exemplary storage module.

FIG. 1C is a block diagram illustrating a hierarchical storage system.

DETAILED DESCRIPTION

Figure 2A:
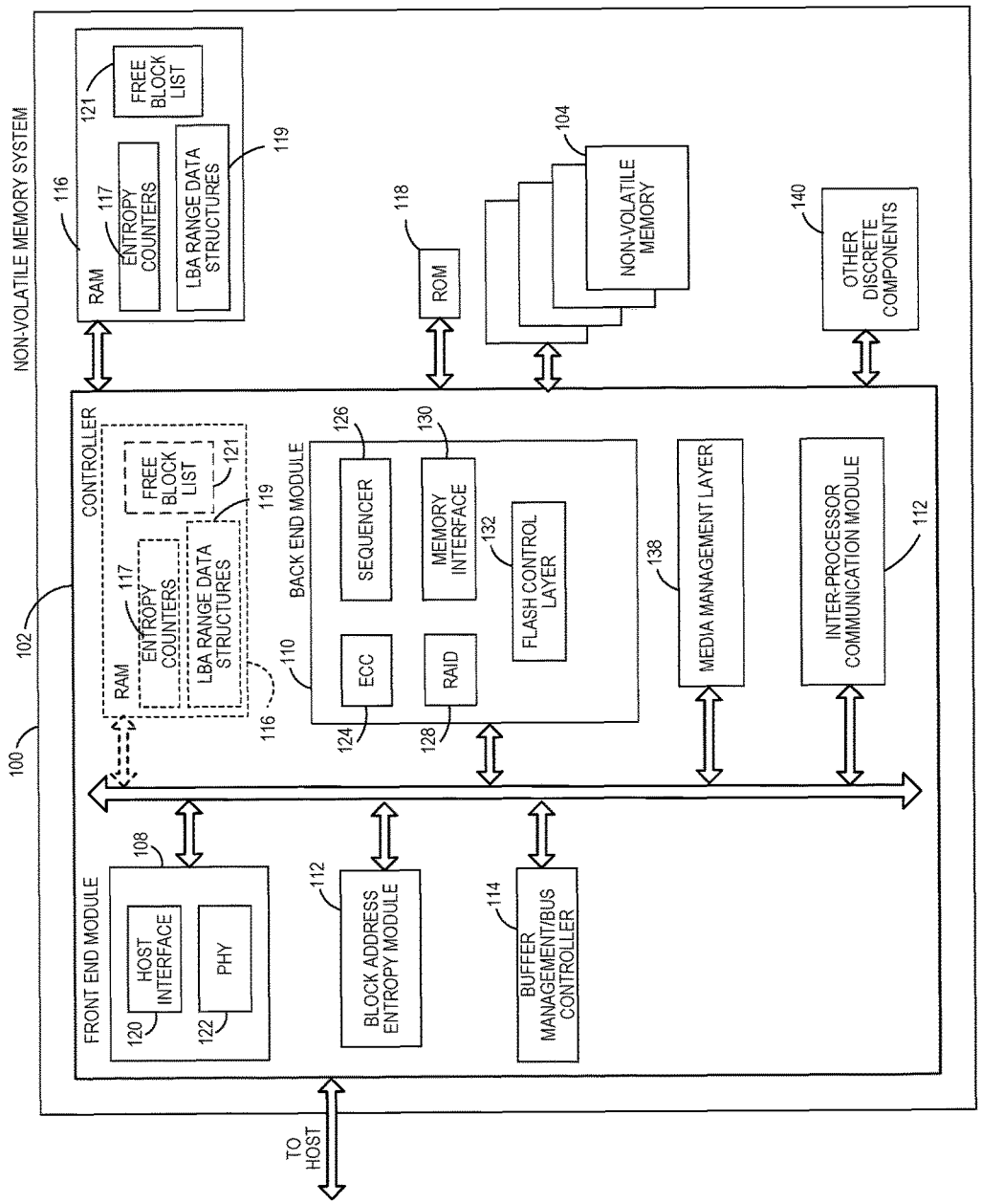
FIG. 2A is a block diagram illustrating exemplary components of a controller of a non-volatile memory system.

Previously fully programmed blocks, also referred to herein as closed blocks, in a non-volatile memory are used in a garbage collection process to create more free space in the non-volatile memory. Typically, a closed block is selected, the valid data from that closed block is moved to a new block, and the closed block is then erased for reuse. When the size of the RAM cache of a non-volatile memory system is smaller than the size of the logical-to-physical mapping table, overhead problems can occur. In such a situation, only a small piece of a mapping table may be held in RAM at any one time. When the addresses for the data in a particular closed block are spread across widely different address ranges of the logical address space, then garbage collection performance may be adversely impacted when that particular block is selected as compared to another closed block that contains data over a narrower address range because multiple different pieces of the mapping table will need to be retrieved from the non-volatile memory. In order to avoid a decrease in garbage collection performance that may occur when a RAM cache available for storing mapping information is less than the amount of mapping information, a method and system for tracking block mapping overhead is provided.

An implementation of the approach described herein may involve storing a metric on a per-block basis of the actual or estimated number of distinct mapping table reads that would be required to garbage collect a particular block. This is termed the 'logical address entropy' (also referred to as block address entropy) of the block. This information can be used to modify the source block selection criterion within a garbage collection operation. As described in greater detail below, a new block level data structure and block level address entropy counter are disclosed that allow the non-volatile memory device to estimate the number of different mapping table calls that may be required to verify the validity of data in a closed block.

According to a first aspect, a non-volatile memory system includes a non-volatile memory having a plurality of memory blocks and a processor in communication with the non-volatile memory. The processor is configured to receive data from a host and store the received data in an open block in the non-volatile memory. The processor is further configured to update a logical block address (LBA) range data structure dedicated exclusively to the open block to identify one of a plurality of predetermined LBA ranges associated with the received data. The processor is configured to update the LBA range data structure only when the LBA range of the received data contains data associated with a host LBA falling in one of the predetermined LBA ranges for a first time in the open block. In different implementations, the processor is further configured to update a LBA data range counter each time data in a different LBA range of the predetermined plurality of LBA ranges is first received for the open block or, upon completely filling the open block with received data, store the LBA data range counter in a block address entropy data structure, where the block address entropy data structure comprises respective LBA data range counters for closed blocks in the non-volatile memory.

In another aspect, a non-volatile memory system is disclosed having a non-volatile memory having a plurality of blocks and a processor in communication with the non-volatile memory. The processor is configured to receive data from a host; and store the received data in an open block in the non-volatile memory. As the received data is stored in the open block, the processor is further configured to determine a block address entropy value for the open block, wherein the block address entropy value comprises a number of different mapping address table pieces from a predetermined number of mapping address table pieces of a main mapping table that correspond to logical addresses of the received data in the open block. Upon fully programming the open block, the processor is further configured to store the block address entropy value in an entropy value data structure, the entropy value data structure configured to store a respective block address entropy value for each fully programmed block in the non-volatile memory.

According to another aspect, a method of tracking block address entropy in a non-volatile memory system includes receiving data at a non-volatile memory having a plurality of blocks and storing the received data in a block of the plurality of blocks. The method further includes marking logical ranges of the received data in predetermined logical range entries of a logical block address range data structure associated with the block, where each predetermined logical range entry corresponds to a different piece of a mapping table for the non-volatile memory system. The method includes determining the block address entropy value for the block based on the sum of different predetermined logical range entries marked for the block in the logical block address range data structure. Responsive to fully programming the block, the non-volatile memory system stores the determined block address entropy value and deletes the logical block address (LBA) range data structure associated with the block. In one implementation, the determined block address entropy value is based on a total number of mapping table pieces corresponding to the logical addresses in the block, while in another implementation, when the LBA range data structure is configured to only track a portion of the total of mapping table pieces, the determined block address entropy value is an estimate based on the portion of mapping table pieces that the LBA range data structure is capable of tracking.

In yet another aspect of the invention, a non-volatile memory system includes a non-volatile memory having a plurality of memory blocks and means for receiving data from a host and storing the received data in an open block of the non-volatile memory. The system further includes means for storing logical block address (LBA) range data exclusively for the open block and for updating the LBA range data only when an LBA range of the received data contains data associated with a host LBA falling in one of a predetermined number of LBA ranges for a first time in the open block.

In different variations of the disclosed method and system, the block address entropy value may be used in conjunction with different functions of the non-volatile memory. In one implementation, as part of a garbage collection operation, the process of determining a source block from which to move valid data and generate a free block may be based on the absolute or comparative block address entropy value for closed blocks, where closed blocks with lower block address entropy values may be selected over blocks with higher block address entropy values. In another implementation, the average block address entropy value of a group of blocks having a common block type may be determined and, when the average block address entropy value for that group is above a predetermined value, the routing of subsequently received data may be changed to route that subsequent data to storage into blocks of a different block type.

FIG. 1A is a block diagram illustrating a non-volatile memory system. The non-volatile memory (NVM) system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, one or more microprocessors or processors (also referred to herein as central processing units (CPUs)), and a computer-readable medium that stores computer-readable program code (e.g., software or firmware) executable by the (micro)processors, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A NVM system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural NVM systems 100. As such, storage module 200 may include a storage controller 202 that interfaces with a host and with storage system 204, which includes a plurality of NVM systems 100. The interface between storage controller 202 and NVM systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a block address entropy module 112 present on the die of the controller 102. As described below, the block address entropy module 112 may provide functionality for tracking and storing control data, for each block, on the number of mapping table pieces that the NVM system may need to access the particular logical address ranges of the data in each block. The block address entropy module may also manage the use of that control data in selecting blocks for maintenance activities, such as garbage collection, in the NVM system 100. A buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller. Further, in some implementations, the controller 102, RAM 116, and ROM 118 may be located on separate semiconductor die.

The RAM 116 in the NVM system 100, whether outside the controller 102, inside the controller or present both outside and inside the controller 102, may contain a number of items, including a copy of one or more pieces of the logical-to-physical mapping tables for the NVM system 100. The RAM 116 may contain block address entropy counters 117 for each block of non-volatile memory and logical block address (LBA) range data structures 119 that, as explained in greater detail below, track the number of different pieces of the mapping table necessary for determining the validity of data in each respective closed non-volatile memory block (address entropy counters) and allow the counting of how many mapping table pieces are relevant to a particular open non-volatile memory block (LBA range data structures). The RAM 116 may also include a free block list 121 identifying free blocks available for use in the non-volatile memory 104.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the NVM system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of NVM system 100 illustrated in FIG. 2A include the media management layer 138, which performs wear leveling of memory cells of non-volatile memory die 104 and manages mapping tables and logical-to-physical mapping or reading tasks. NVM system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
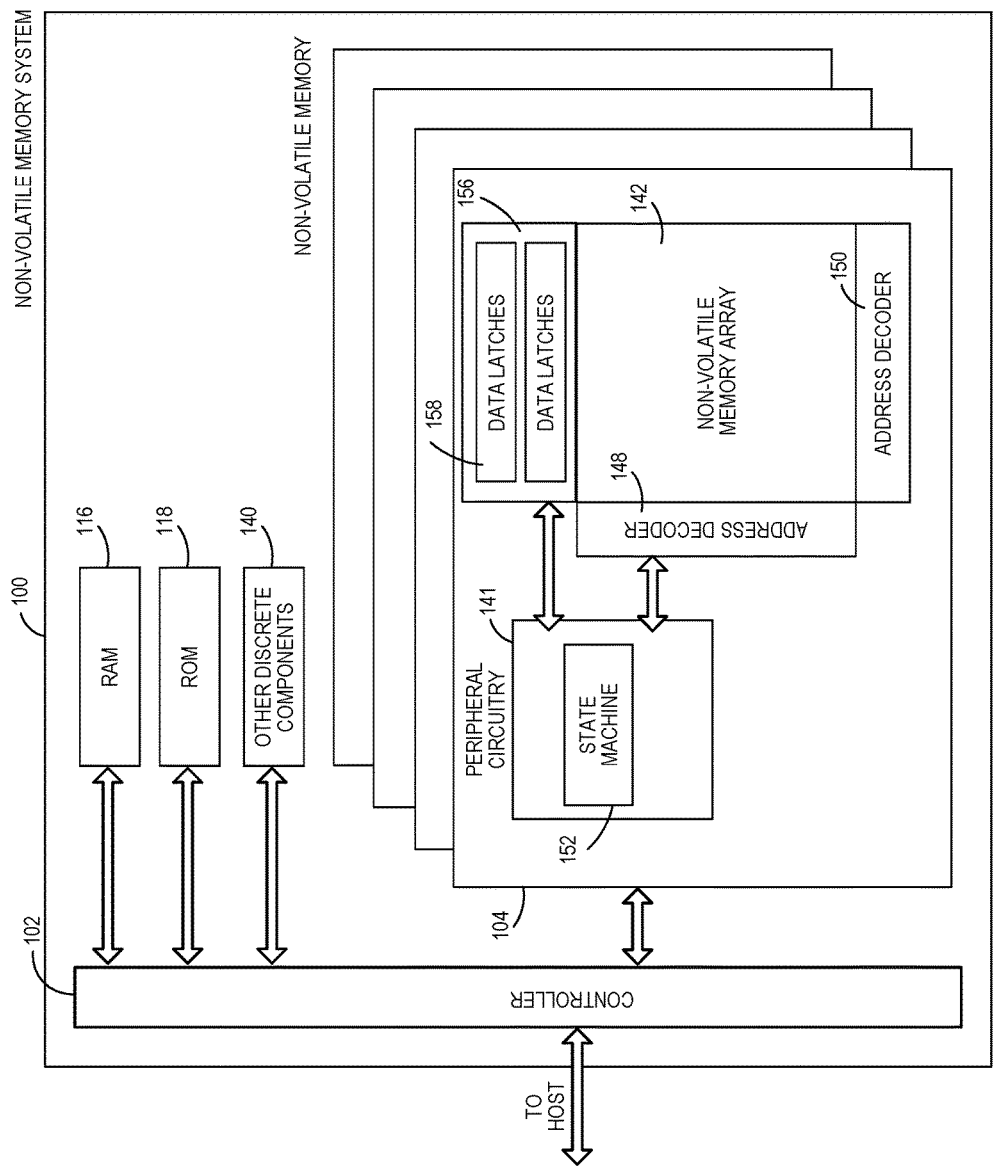
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two-dimensional and/or three-dimensional configuration. Peripheral circuitry 141 includes a state machine 152 that provides status information to controller 102. Non-volatile memory die 104 further includes a data cache 156 that caches data being read from or programmed into the non-volatile memory cells of the non-volatile memory array 142. The data cache 156 comprises sets of data latches 158 for each bit of data in a memory page of the non-volatile memory array 142. Thus, each set of data latches 158 may be a page in width and a plurality of sets of data latches 158 may be included in the data cache 156. For example, for a non-volatile memory array 142 arranged to store n bits per page, each set of data latches 158 may include N data latches where each data latch can store 1 bit of data.

In one implementation, an individual data latch may be a circuit that has two stable states and can store 1 bit of data, such as a set/reset, or SR, latch constructed from NAND gates. The data latches 158 may function as a type of volatile memory that only retains data while powered on. Any of a number of known types of data latch circuits may be used for the data latches in each set of data latches 158. Each non-volatile memory die 104 may have its own sets of data latches 158 and a non-volatile memory array 142. Peripheral circuitry 141 includes a state machine 152 that provides status information to controller 102. Peripheral circuitry 141 may also include additional input/output circuitry that may be used by the controller 102 to transfer data to and from the latches 158, as well as an array of sense modules operating in parallel to sense the current in each non-volatile memory cell of a page of memory cells in the non-volatile memory array 142. Each sense module may include a sense amplifier to detect whether a conduction current of a memory cell in communication with a respective sense module is above or below a reference level.

Figure 3:
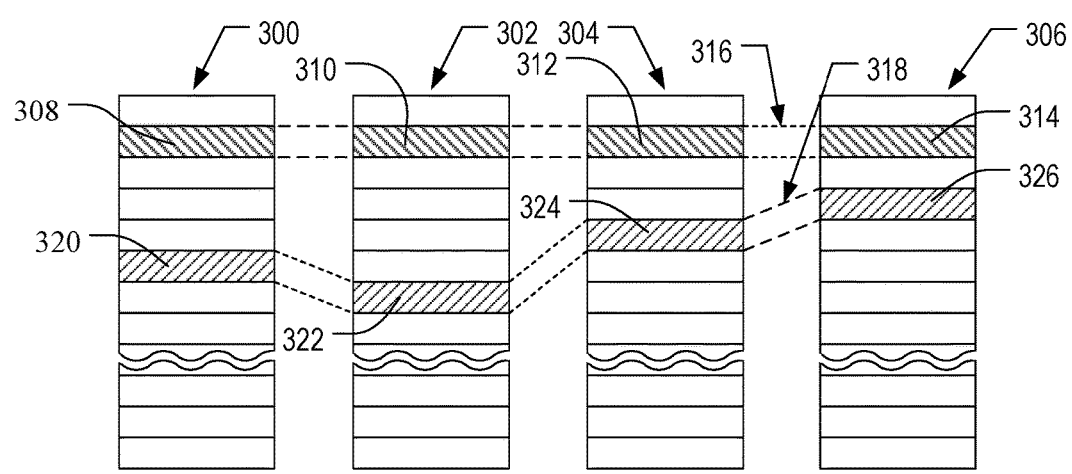
FIG. 3 illustrates an example physical memory organization of the non-volatile memory system of FIG. 1A.

The non-volatile flash memory array 142 in the non-volatile memory 104 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a representative flash memory cell array is shown. Four planes or sub-arrays 300, 302, 304 and 306 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
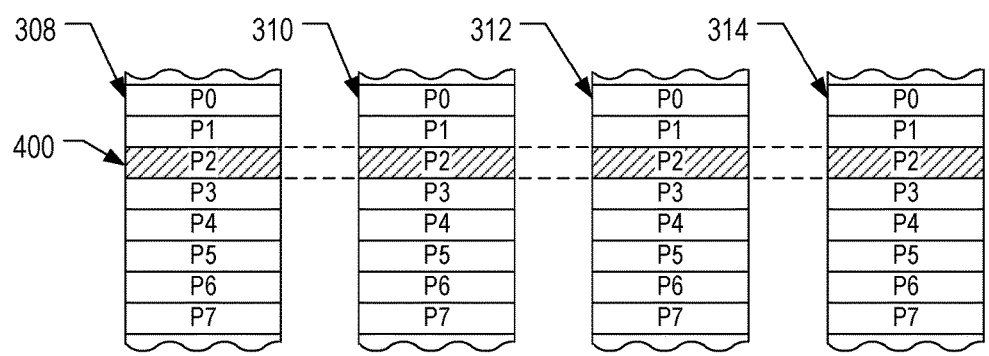
FIG. 4 shows an expanded view of a portion of the physical memory of FIG. 3.

The individual blocks are in turn divided for operational purposes into pages of memory cells, as illustrated in FIG. 4. The memory cells of each of blocks 308, 310, 312 and 314, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 400 is illustrated in FIG. 4 as formed of one physical page for each of the four blocks 308, 310, 312 and 314. The metapage 400 includes the page P2 in each of the four blocks but the pages of a metapage need not necessarily have the same relative position within each of the blocks. A metapage is typically the maximum unit of programming, although larger groupings may be programmed. The blocks disclosed in FIGS. 3-4 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the non-volatile memory system 100 where the data is physically stored.

Figure 5:
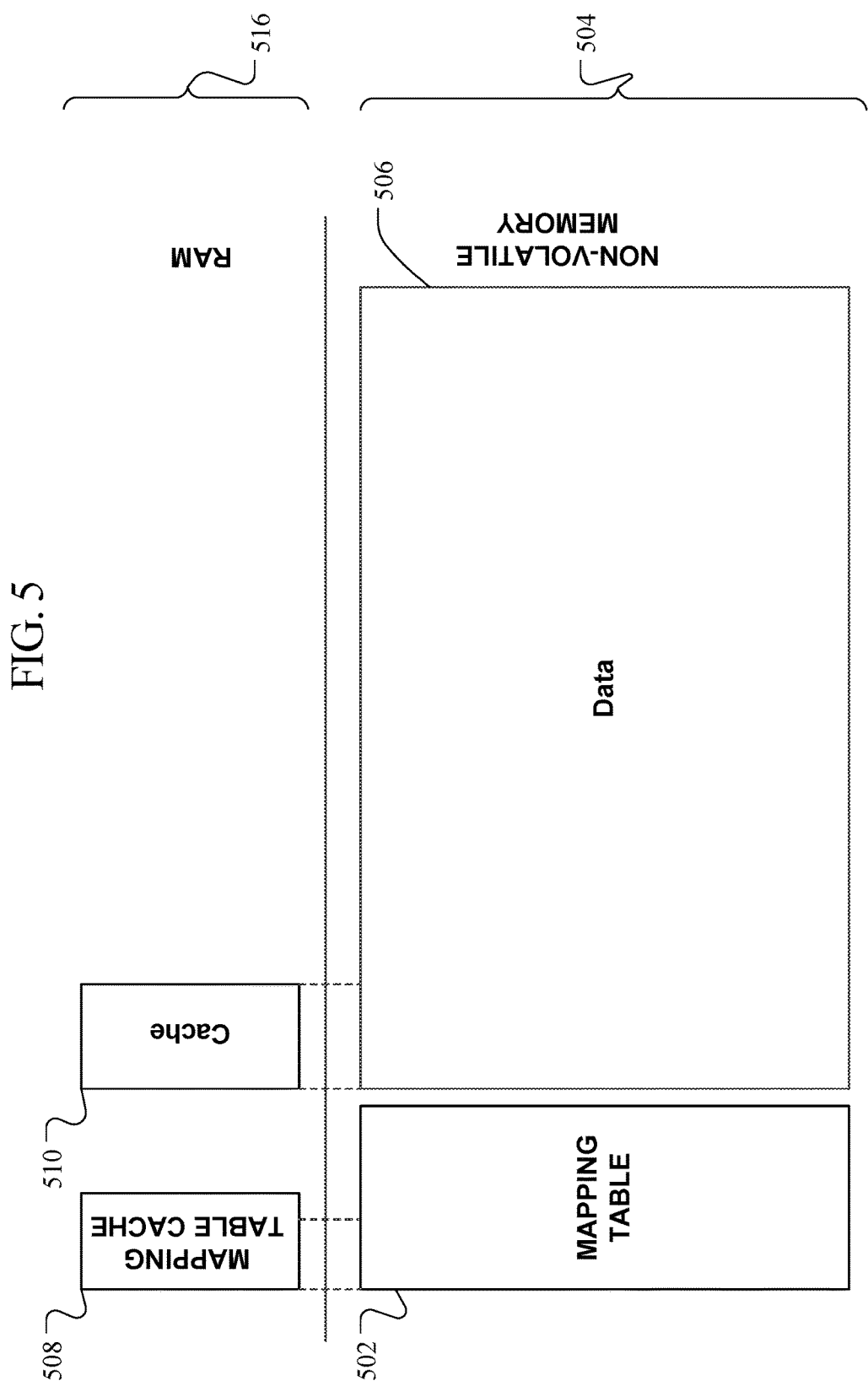
FIG. 5 illustrates a conceptual distribution of user data and mapping data between non-volatile and volatile memories of a non-volatile memory system.

In FIG. 5, a conceptual illustration of the non-volatile memory 504 (corresponding to non-volatile memory 104 in FIGS. 2A-2B) and RAM 516 (corresponding to RAM 116 in FIGS. 2A-2B) shows an example logical-to-physical mapping table 502 for a NVM system 100 having a relatively small mapping table cache 508, where only pieces of the complete mapping table can be retrieved and stored in RAM 516 at any given time due to a limited RAM capacity. The portion of the RAM 516 identified as the cache 510 may be used for a portion of the data 506 stored in the non-volatile memory 504, such as user data being sent to and from a host, as well as control data including the LBA range data structures and block address entropy counters described below, as well as the free block list and other control information used internally by the NVM system.

The mapping table 502 stores mapping information, typically at a host data granularity of a cluster (where each cluster may be a 4 Kbyte chunk of data), that contains the current physical location of each logical data cluster. The mapping table 502 allows all data to be retrieved when requested by the host. The full mapping table 502 is stored in non-volatile memory 504, but since it is typically large it is broken down into many smaller pieces. One or more of these mapping table pieces may be cached in local RAM 516, but the RAM size or allocation of space to mapping data in the RAM may permit only one or less than all of the mapping pieces to be cached at any particular point in time. The pieces of the mapping table in RAM may contain updates that have yet to be committed to the full mapping table in non-volatile memory. The RAM space for all cached mapping pieces is the mapping table cache 508, sometimes referred to as the mapping cache.

Figure 6:
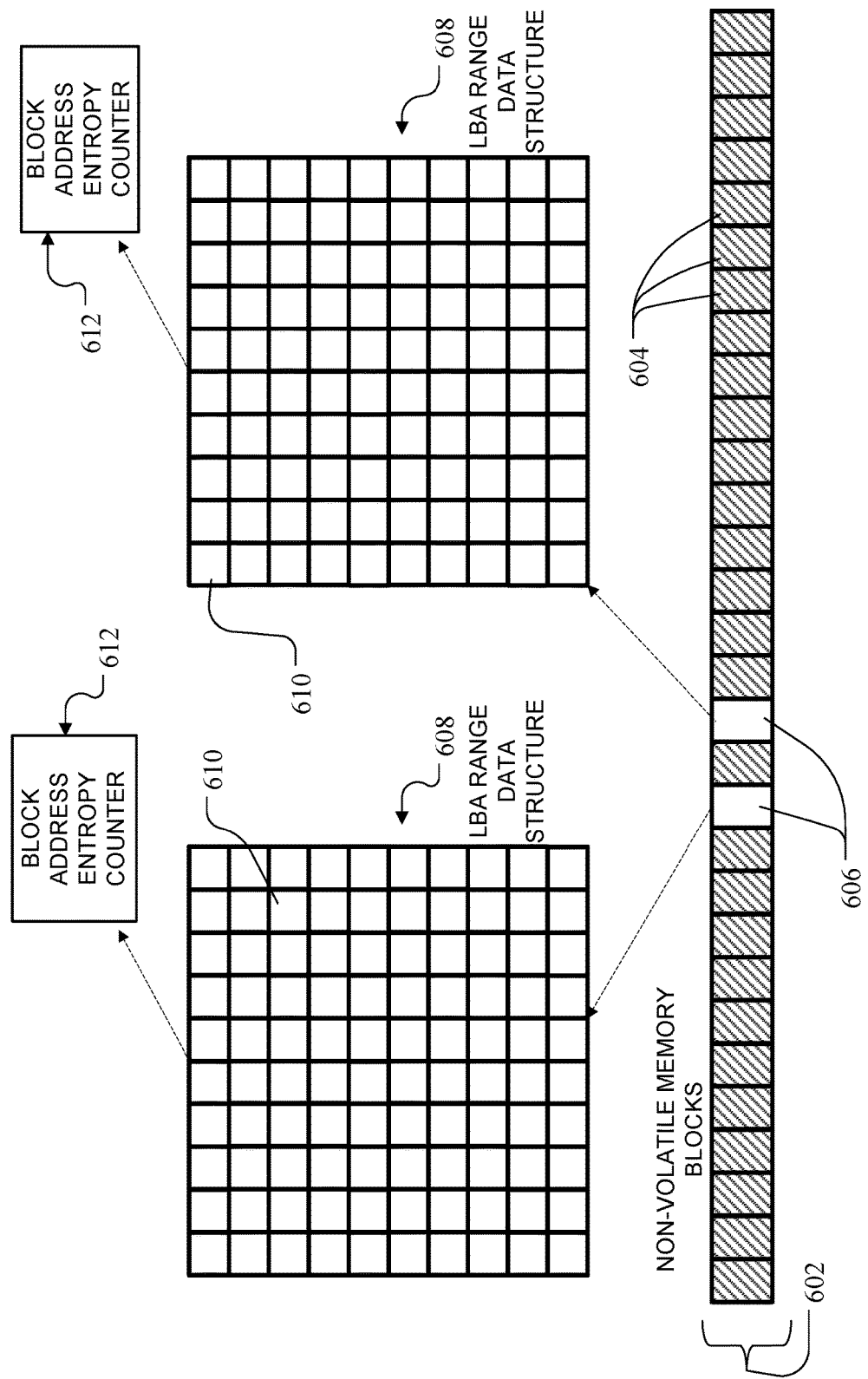
FIG. 6 is an example of physical blocks of a non-volatile memory and LBA range data structures and block address entropy counters associated with respective blocks.

Referring to FIG. 6, a simplified array 602 of physical blocks is shown that may be representative of the physical blocks included in the non-volatile memory 104 of the NVM system 100. The illustrated blocks include closed blocks 604 that have been fully programmed and open blocks 606 that are unprogrammed, or partially programmed, and available to receive additional data. In one implementation, the controller 102, via the block address entropy module 112, generates and maintains a logical block address (LBA) range data structure 608 for each open block 606 in the NVM memory to track what LBA ranges are associated with the data that is programmed in those open blocks. Each of the LBA range data structures 608 may be a bitmap where each entry 610 represents a predetermined range of LBA addresses of the total logical address range of the NVM system 100. In one implementation, each entry 610 is assigned to a respective one of a plurality of equal size pieces of the entire logical-to-physical mapping table that covers the full logical address range addressable in the NVM system.

Simply for ease of illustration, assuming an LBA range data structure 608 in the form of a 10×10 bitmap array and assuming a NVM system 100 with a total logical address space of 10,000 addresses (0-9999), then each of the 100 entries 610 of the LBA range data structure 608 of this example would have a single bit representative of a single different set of 100 LBAs (e.g., 0-99, 100-199, 200-299 and so on until the final entry 610 of 9900-9999). The portion of the total LBA range represented by each entry 610 of the LBA range data structure may be equal to the address range of each piece of the total mapping table that the RAM 116 (FIG. 2A) may hold at any one time. In other words, the mapping table of the NVM system is broken up into a predetermined number of fixed size pieces that are each sized to be equal to the space available in the RAM 116. Because the number of entries 610 in the LBA range data structure 608 would then be equal to the number of mapping table pieces possible, the number of different mapping table pieces that are necessary for determining mapping information on data in a given block may be determined, as discussed below. The numbers provided above are merely provided by way of example and it should be understood that the number of entries 610 in the LBA range data structure 608, the address range of the particular NVM system and the sizes of the portion of the LBA range assigned to each entry 610 may differ in other implementations.

Utilizing the LBA range data structure 608 described above, when data is written to an open block 606 of non-volatile memory 102, if the data is associated with a particular range of LBAs and it is the first time that any data in that LBA range has been written to the particular open block 606, then the bit in the entry 610 of the LBA range data structure 608 associated with that specific range is flipped by the controller 102 from the default value (e.g. "0") to an second value (e.g. "1") to flag that LBA mapping information for that particular logical (LBA) address range will be needed for that block from a mapping table. Any subsequent write of data that has a logical address in the same range as other data already written to the particular open block is ignored. Because the same mapping table piece would be used to determine the physical location of that later written data, no further tracking of that logical address range is needed. Thus, the bit in the LBA range data structure 608 that represents the particular piece of the logical address range is left in the "1" state from the initial time it was flipped. The controller 102, via the block address entropy module 112, may store the LBA range data structure 608 for each open block 606 in RAM 116 (FIG. 2A) and periodically also store the LBA range data structures 608 in non-volatile memory, such as non-volatile memory 104, to preserve data and avoid issues with planned or unexpected power loss to the NVM system 100. In one implementation, a LBA range data structure 608 is generated for, and only exists for, open blocks 606.

Although an example of a one-to-one relationship of bits in the LBA range data structure to different mapping table pieces is discussed above and below in greater detail, implementations where the LBA range data structure tracks less than the entire number of mapping table pieces are also contemplated. For example, the example LBA range data structure noted above is a bitmap having 100 bits and the 10,000 addresses of the main mapping table are divided into 100 mapping table pieces of 100 addresses each. Thus there is one bit available for every mapping table piece and the LBA range data structure has a one-to-one relationship of bits to mapping table pieces. There are instances when the LBA range data structure may be designed to have fewer bits than the number of mapping table pieces, for example if the NVM system instead has a main mapping table broken into 10,000 mapping table pieces where the LBA range data structure only has 100 bits available (i.e. a 100-to-1 relationship of mapping table pieces to bits). In such instances, only an estimate of the block entropy may be tracked for each block because the lower granularity LBA range data structure (e.g., greater number of mapping table pieces than bits to track them) may not be able to track all the different mapping table pieces associated with the data actually in a block. This example lower granularity LBA range data structure may track a specific predetermined 100 mapping table pieces out the hypothetical 10000 mapping table pieces, may actively assign the 100 bits to each of the first 100 different mapping table pieces that are associated with data in the block, or may assign each of the 100 bits to a separate group of 100 mapping table pieces where each bit tracks whether any of the assigned 100 mapping table pieces is associated with data in the block, but not how many of those 100 mapping table pieces are associated with the data in the block. Other reduced granularity techniques and configurations for the LBA range data structure are also contemplated. While not as accurate as a one-to-one tracking of exactly how many mapping table pieces correspond to data in a given block, this reduced granularity approach of a LBA range data structure with only some mapping table pieces being tracked can still provide a useful estimate of the amount of mapping table retrieval a closed block may require. Any of a number of different LBA range data structure sizes, and mapping table sizes and mapping table piece numbers may be utilized in different embodiments.

When an open block 606 is fully programmed, becoming a closed block 604, the space in RAM 116 reserved for the LBA range data structure 608 (corresponding to one of the LBA range data structures 119 in FIG. 2A) associated with that formerly open block may be overwritten. Prior to deletion of the LBA range data structure 608 for the now closed block 604, a block address entropy counter 612 (corresponding to one of the counters in block address entropy counters 117 of FIG. 2A) is updated and stored in RAM 116 for the now closed block 604. The block address entropy counter 612 for a closed block 604 may be a counter that sums up the number of flipped bits in the LBA range data structure 608 that was generated while the block was an open block 606. In one implementation, each flipped bit corresponds to a different fixed LBA range corresponding to a different piece of the total logical-to-physical mapping table. The block address entropy module 112 and controller 102 sum the flipped bits found in the entries 610 for the LBA range data structure 608 of a particular block and store that as the value of the block address entropy counter 612 for that block. Thus, the value of the block address entropy counter 612 may represent the total number of pieces of the mapping table that need to be retrieved and parsed for that block (or an estimate of the number of mapping table pieces, in implementations where the LBA range data structure has fewer bits than the number of mapping table pieces) when the data in that block is later reviewed to determine what data in that block is valid, for example when an assessment is later made for garbage collection.

Figure 7:
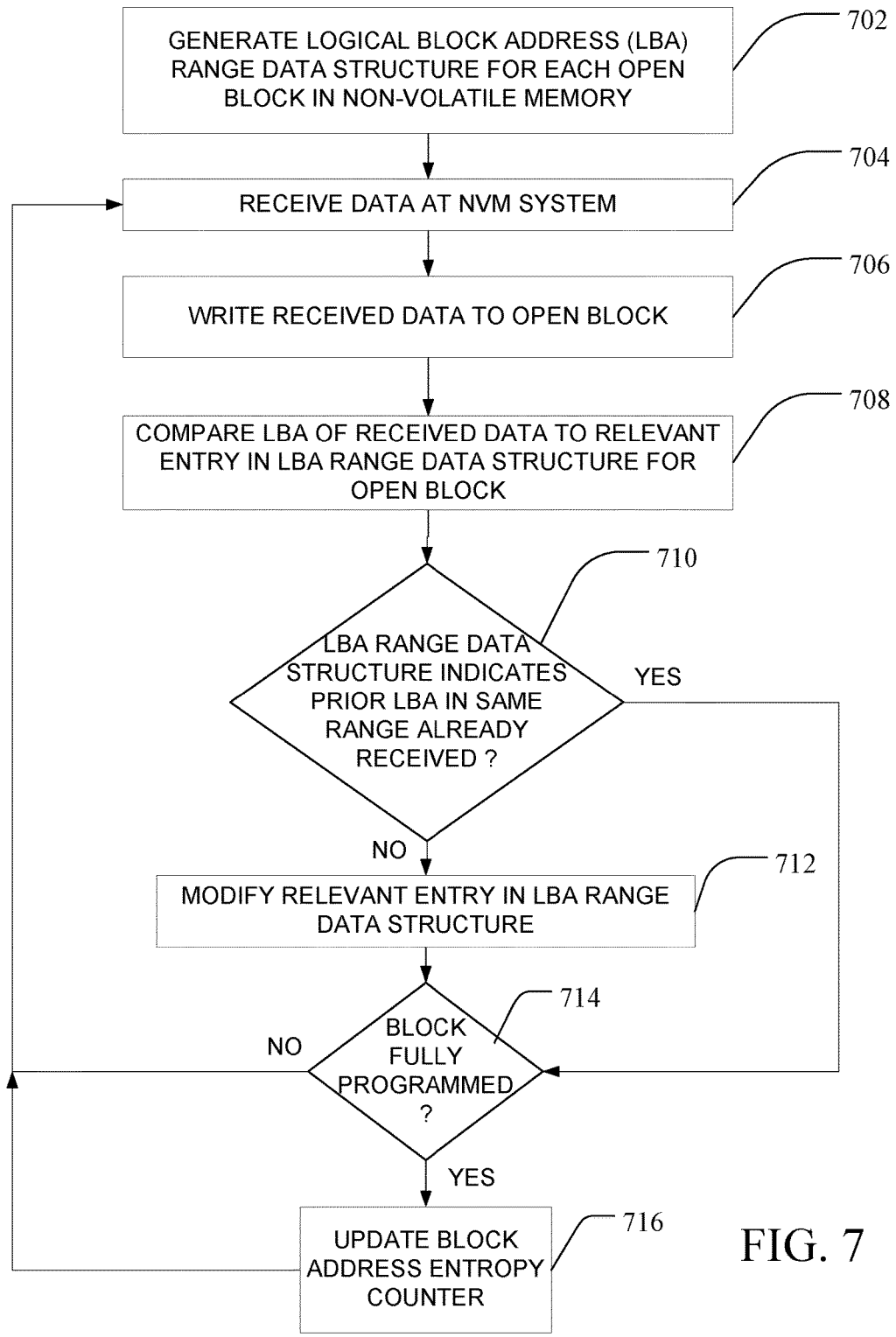
FIG. 7 is a flow diagram illustrating an embodiment of a method of tracking block address entropy in a non-volatile memory system.

With reference to FIG. 7, one implementation of a method of generating an LBA range data structure is provided. The controller 102, via the block address entropy module 112, generates LBA range data structures 608 for each open block 606 in the NVM system 100 (at 702). This may be accomplished by the controller setting aside space in the RAM 116 for a separate LBA data structure for each open block, where each LBA data structure is configured with a predetermined number of entries each representing a predetermined portion of the logical address space, and thus a predetermined piece of the overall mapping table for the NVM system. When the LBA range data structure is first generated for an unwritten block, each entry of each LBA range data structure is initialized to a default state, for example "0" that will later be flipped to a different state, for example "1", if and when data having a logical address in the predetermined range for that particular entry is received and written to the associated open block.

As data is received at the NVM system 100 (at 704), the controller routes the received data to a particular open block in the non-volatile memory and writes the received data to that open block (at 706). The decision as to which open block to write to may be made via any of a number of known block selection or data routing algorithms. When the received data is written to an open block, the LBA information associated with that data is compared to the relevant entry in the LBA range data structure associated with the open block to see if the logical address falls in a same predetermined range as other data previously written to that open block (at 708, 710). If the entry in the LBA range data structure 608 associated with the open block 606 and with a predetermined LBA range that includes the logical address is still in its default initialized state (e.g. "0"), then the controller updates that entry of the LBA range data structure and flips the state to a "1" (at 712). Alternatively, of the relevant entry in the LBA range data structure already has a value of "1", then other data within the predetermined LBA range covered by that entry has already been received (and thus the mapping table piece associated with that predetermined range would already need to be acquired when the block is later read) and so the value of the relevant entry is not changed.

Referring again to the example described above of a LBA range data structure 608 being a bitmap with entries for each of a plurality of different predetermined LBA ranges, if the hypothetical NVM system 100 has a logical capacity of 10,000 addresses and pieces of the overall mapping table of logical-to-physical addresses has to be broken into 100 logical address pieces, then the LBA range data structure 608 would be predetermined to have 100 entries (i.e. 100 different bits) each associated with a different 100 logical address range (e.g. the bit for entry 1 being associated with addresses 0-99, the bit for entry 2 being associated with logical addresses 100-199, and so on until entry 100, where the bit of that entry represents any data in the logical address range of 9900 to 9999). The term "relevant entry" used above refers to the entry in LBA range data structure corresponding to the logical address range within which the data that written to the associated block falls.

By way of example, if the logical address of the received data written to the open block is logical address 1525, then the entry associated with the range of 1500-1599 in the above example would be the relevant entry that is examined to see if the bit has been flipped (indicative of other data in that range already having been written to the open block) or if the bit is in the default state (indicating that no prior data in that range has been written to the open block). Although an example full mapping table of 10,000 logical address range broken into 100 mapping table pieces of 100 addresses each is discussed, and each LBA range data structure is described as a bitmap having a corresponding 100 one bit entries, this is simply one example for ease of illustration and other LBA data structure data types, sizes of mapping table pieces and mapping table address capacities may be implemented.

Referring again to FIG. 7, after determining whether to modify a relevant entry in the LBA range data structure 608 for an open block 606 based on examining the logical address of the data written to that open block, the controller 102 checks to see if the open block has been filled (also referred to as fully programmed) (at 714). If the open block still has unwritten capacity, then the process of receiving data and modifying the LBA range data structure as appropriate for that open block continues. Once the open block is fully programmed with data, the controller may then update a block address entropy counter for the block (at 716). The controller may then move on to another open block and modify the LBA range data structure for that open block as described above. Also, once the block is fully programmed and thus becomes a closed block, the LBA range data structure 608 for that block may be automatically deleted and/or overwritten by other data once the block address entropy counter 612 has been finally updated.

In order to update the block address entropy counter, the controller, via the block address entropy module 112, may wait until an open block becomes full (fully programmed), count the number of entries in the LBA range data structure with flipped bits, and then store that counter value in RAM 116. In alternative implementations, rather than waiting until the block is closed (fully programmed) and then counting all of the flipped bits in the LBA range data structure for the block, the block address entropy counter may keep a running total of flipped bits and thus be updated to increment the current total current number of flipped bits in the LBA range data structure each time a different entry has a bit flipped from the default state to the high state (e.g. from a 0 to a 1).

When an open block is filled, the counter value may be stored within a block-related control structure (typically such a structure already exists to hold valid data counts of blocks). The counter may be compressed since a precise value is not required. The counter value is that block's 'logical address entropy'. A higher value indicates more mapping pieces are referenced by the data in the block, which can indicate that this block will be slow to garbage collect. Conversely a lower counter value, specifically a number to a smaller address range or smaller number of mapping table pieces than the effective size of the mapping table cache, indicates potentially faster garbage collection. It should be noted that a block address entropy counter value does not account for the state of the mapping table cache 508. In other words, the value of the block address entropy counter does not indicate what fraction of the mapping table pieces by chance or design happen to be in the mapping table cache 508 at any given time.

In one implementation, the block address entropy counter for a block may be reset to zero when a free block first becomes an open block and data is stored there. The block address entropy counter is maintained for the block when it becomes a closed block. The total number of flipped bits in the LBA range data structure associated with the block may be counted and stored as the block address entropy counter after every data write to the open block, regardless of whether any change has been made to the LBA data structure as a result of the latest write activity. A block address entropy counter may be generated for each block in the non-volatile memory and stored in RAM 116. Unlike the LBA range data structures which, in one implementation, only exist when a block is an open block and subsequently may be erased or otherwise overwritten, a block address entropy counter is stored for each block and persists for all closed blocks until those blocks are erased. In summary, each block address entropy counter may be reset when its associated physical block is garbage collected and it may be incremented as the block is being written to, or the value of the counter may set at the time the block is fully programmed, in different implementations.

Figure 8:
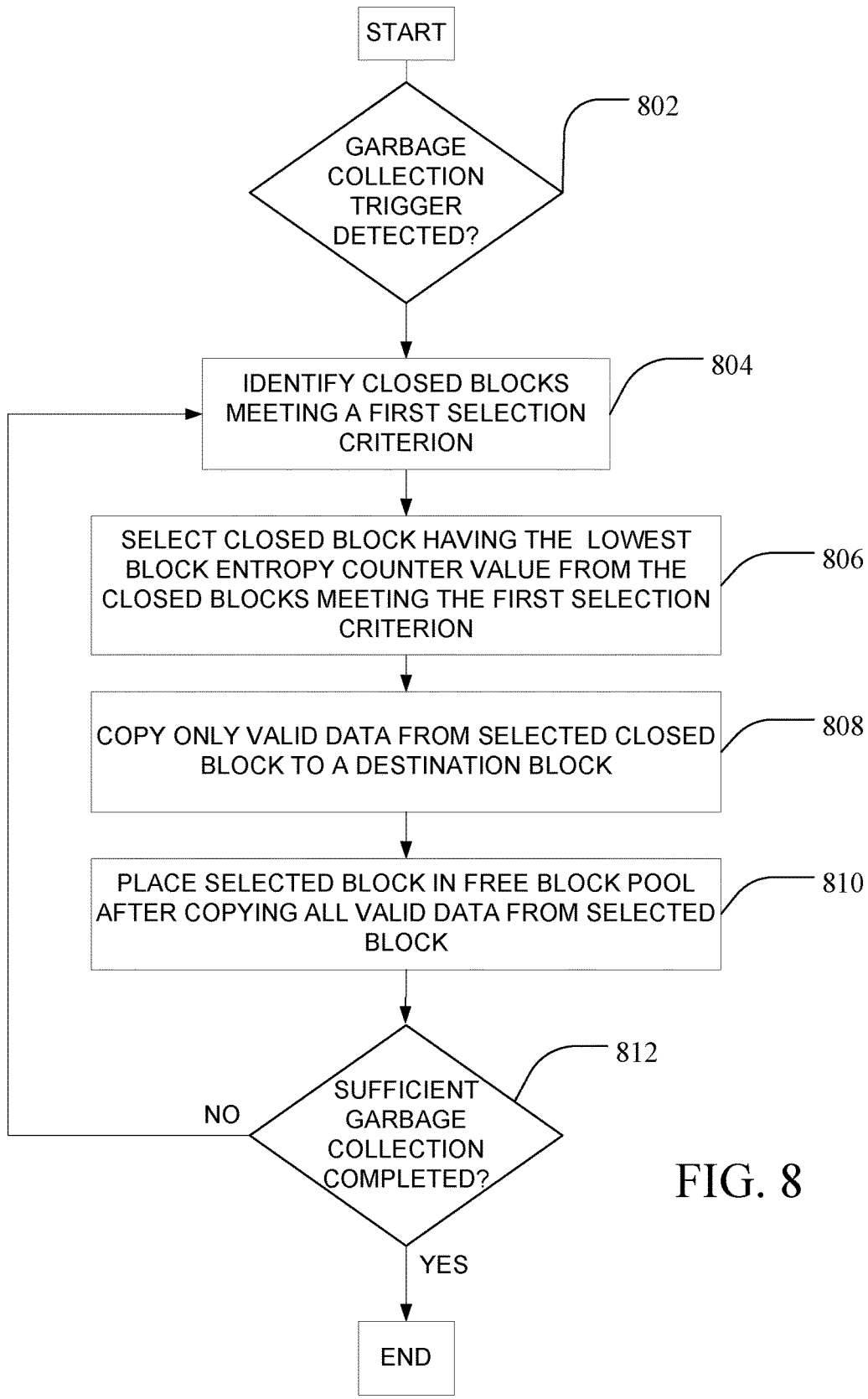
FIG. 8 is a flow chart of a process that may be implemented to use block address entropy values as determined in the process of FIG. 7 to adjust a garbage collection process.

Referring now to FIG. 8, when the NVM system 100 runs out of enough free blocks, where a free block refers to a block without any valid data that is available for use as an open block, a garbage collection process may be initiated by the controller detecting a garbage collection trigger (at 802). The trigger for initiating a garbage collection operation may be a drop in the number of free blocks below a minimum threshold number, or any of a number of other known garbage collection triggers. The garbage collection process may be triggered for background operation, where no host commands are pending, based on one trigger and triggered for foreground operation, where there are pending host commands that must be delayed for garbage collection or interleaved with garbage collection, based on a different trigger. Once the garbage collection process is initiated, the garbage collection process includes selection by the controller 102 of a closed block as the source block from which valid data is to be moved to a destination block, so that the source block can subsequently be freed up and placed in a free block pool for the NVM system 100.

The selection may be based on a first selection criterion, where a set of closed blocks are initially identified that meet the first criterion (at step 804). For example, the first selection criterion may be all blocks having a least amount of valid data. The least amount of valid data criterion may result in the controller 102 identifying a number of blocks with a same minimum amount of valid data, or may identify a group of closed blocks having no more than a predetermined amount of valid data. Other criteria, such as identifying the least recently used (least recently programmed) blocks, may be used instead of or in conjunction with other criteria such as the least amount of valid data criterion noted above for identifying potential source blocks from the closed blocks.

From those closed blocks identified using the first selection criterion, the controller 102 may then utilize the block address entropy counter value for each respective one of the identified closed blocks and select the identified closed block with the lowest counter value as the source block (at 806). Once selected, the controller copies only the valid data from the selected source block to an open block (at 808) and then places the source block into a free block pool after copying all the valid data from the source block (at 810). The free block pool may be a list 121 of blocks maintained in RAM 116 that are available for reuse for writing new data (e.g. for data received from a host and/or garbage collected data from a different source block). The blocks listed as in the free block list 121 as being part of a free block pool may be erased when placed in the free block pool, or may be later fully erased when they are needed for reuse.

In alternative implementations, the process for selecting blocks for garbage collection set out in steps 804 and 806 may be altered. For example in one implementation, the first step 804 may instead be to identify the blocks with the least amount of valid data (using that criteria alone or in combination with other criteria) and the second step 806 may instead be to then select from those blocks identified in modified step 804 those blocks with the lowest block entropy counter value. In yet another alternative implementation, rather than separate iterations of identifying the block(s) with the least amount of valid data and then selecting the block from those identified block with the lowest block entropy counter value a more nuanced weighting approach may be taken by the controller. For example, steps 804 and 806 may be combined into a single step that combines the valid data count for each block and entropy value represented by the block entropy counter value into a composite metric using any of a number of desired weighting factors. In this way, blocks that may not have the absolute least amount of valid data, but have very low block entropy counter values, may be weighted more favorably for selection than blocks having the absolute least amount of valid data but with high block entropy counter values. The block entropy counter may be utilized as a multiplier or additive factor to the amount of valid data in the particular block to form the composite metric. Also, although the block entropy counter value is set at the time a block is closed, the amount of valid data in the block may be dynamic so that the calculation of the composite metric may be a calculation made on-the-fly at the time the garbage collection process commences.

The garbage collection process ends if the controller 102 determines that sufficient garbage collection has been completed (at 812). Any of a number of garbage collection completion factors may be utilized. For example, the controller may end the garbage collection process when enough blocks have been freed to reach a desired free block threshold in the NVM system 100. The process of identifying and selecting closed blocks and copying valid data from those selected blocks continues, however, when the controller 102 determines that sufficient garbage collection has not been completed.

Although it is contemplated that the methods for tracking block address entropy (where block address entropy as used herein refers to the number of separate mapping table pieces that will need to be retrieved for a particular block to look up all of the logical-to-physical mapping information relevant to that block) with the disclosed LBA range data structures 119 and block address entropy counters 117, will find most use with foreground garbage collection, the methods and systems described may be used with only foreground garbage collection operations, only background garbage collection operations or both foreground and background garbage collection operations. Additionally, the weightings used in a composite metric approach such as noted above (e.g. of block address entropy and other criteria such as valid data count, age, and so on) may be different depending on whether it is a foreground or a background garbage collection operation being initiated. For example, in a foreground operation the weighting of the metric may be arranged to avoid high entropy blocks, whereas in a background operation the controller may adjust the weight of the composite metric to select high entropy blocks.

Uses of the block address entropy information gathered by the NVM system 100 via the LBA range data structure and block address entropy counters, aside from garbage collection applications, are also contemplated. For example, the block address entropy of all closed blocks, or a predetermined subset of the closed blocks, in the NVM system 100 may be used to guide the controller 102 in routing subsequently received host data into desired blocks. The non-volatile memory die 104 of the NVM system 100 may include blocks of memory cells of different types, for example different bit-per-cell capacities. As one example, a given non-volatile memory die 104 may include blocks of a first bit-per-cell capacity, for example SLC memory cells, as well as bocks of a second bit-per-cell capacity, such as MLC memory cells. Other block type factors, including the number of program and erase cycles for particular blocks and other block differentiating factors may be considered for the block type. Also, the different block type criteria may be separated between non-volatile memory die 104 in the NVM system 100, or present on a single die 104. Any of these block type factors, alone or in some combination, may be utilized to determine alone or in combination with any other block type factor, in conjunction with the block entropy counter values describe above to adjust how the controller 102 decides to route data received at the NVM system.

Figure 9:
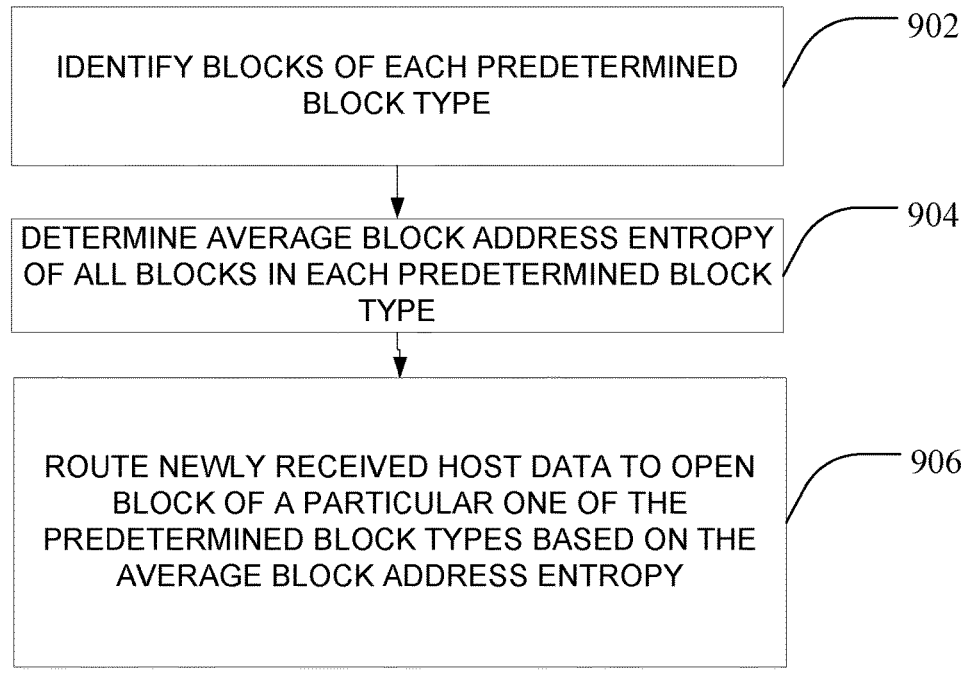
FIG. 9 is a flow diagram illustrating an alternative embodiment of usage of block address entropy values to route received data.

One example of a data routing technique using the block entropy counter values is shown in FIG. 9. Using one of the techniques described with respect to FIG. 6 to generate the block address entropy counter value for each block in the NVM system, the controller can then identify blocks of each particular predetermined block type (e.g. SLC and MLC block types) (at 902) and determine a respective average block address entropy for the set of all blocks in each block type (at 904). The full mapping table in non-volatile memory may include block data type information that is used to identify which groups of blocks are to have block address entropy counter values averaged. It is contemplated that only closed blocks of each data type may be used to determine the average block address entropy, however in other embodiments both open and closed blocks of a same data type may be used to determine the average. Once the average for each data type is obtained, the controller may then apply a predetermined threshold analysis to decide which data type of block to route subsequent data (at 906).

For example, assuming a NVM system with only SLC and MLC data types, where the default data routing procedure is to route host data first to SLC memory blocks, if the average block address entropy is determined to meet or exceed some predetermined threshold (e.g. an average block address entropy counter value of 5, simply as one arbitrary example), then the controller may automatically route subsequent data received from the host directly to MLC blocks, rather than SLC blocks. The averaging of block address entropy values for each block type may be a continuous process occurring at regular intervals of time or simply being recalculated every time another block is fully programmed. The switch in data routing from the default route to the alternate route may continue in this example until the average block address entropy in the SLC blocks falls below the desired threshold. In other implementations, average block entropy counter values of different predetermined block types may be compared against respective thresholds, or against one another, to determine where to route subsequently received host data.

Figure 10:
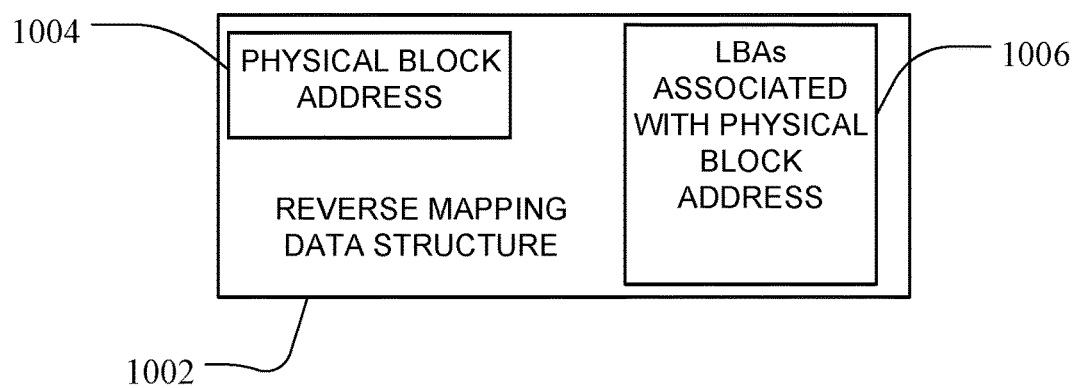
FIG. 10 is a block diagram of a reverse mapping data structure.

In yet another alternative embodiment of usage of the entropy metric information, the block address entropy metric (e.g. block address entropy counter value) for each block may not be stored after the block is closed, but instead the measured value may be compared to a predetermined threshold on fully filling (programming) an open block. If the block address entropy value is above the threshold (indicating the block contains random data spanning many mapping pieces) the controller 102 may choose to keep a reverse map indicating validity for this block in RAM 116. As shown in FIG. 10, the reverse map may be a data structure 1002, such as a bitmap, that stores the physical block address 1004 and all of the LBAs associated with that physical block address 1006. The reverse map stores a bit indicating the validity of each physical location in the block. Such a map can then improve performance of garbage collection of this block when this block is selected for garbage collection because if the reverse map is maintained during the life of the block, the controller then knows which data in the block is valid. In other words, a validity map which is costly in RAM and processing time to maintain is only selectively stored for those blocks for which garbage collection will benefit significantly from having it.

In one implementation, any blocks having a block address entropy metric above a certain threshold may have reverse maps stored, up to the available space allotted in the RAM 116. In another variation of this technique, a predetermined amount of RAM 116 may be set aside that may hold a limited number of reverse mapping bitmaps and the controller may simply store the revere mapping bit map for that limited number of blocks having the greatest block address entropy on a first come basis. If blocks with greater block address entropy counter values are encountered, a reverse mapping table for the higher value entropy blocks may replace those of lower address entropy blocks. Thus, for a solid state drive with a small amount of RAM, when it would not be desirable to store the entire bitmap for all blocks (due to space and firmware overhead, as well as write amplification issues), using block entropy is a way to be selective when storing mapping data. One reason block entropy may be a useful metric and tool is that, without the full bitmap, the memory system can be forced to read all data out during garbage collection and work out (via reading the logical-to-physical, also referred to as forward, mapping tables) if it is still valid. The block entropy counter disclosed above counts the number forward mapping table reads needed so that the memory system can take that into consideration.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two-dimensional memory structure or a three-dimensional memory structure.

In a two dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three-dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional exemplary structures described but cover all relevant memory structures within the spirit and scope of the invention as described herein and as understood by one of skill in the art.

Methods and systems have been disclosed for tracking the block address entropy of individual blocks, or groups of blocks of a particular block type, to improve garbage collection or other NVM system activities. The systems and methods described above may be of use in systems having a limited amount RAM within which to store mapping data. Generation of temporary LBA range data structures for open blocks that are then deleted when those blocks are fully programmed allows a block address entropy value to be determined by determining how many different predetermined logical address ranges are utilized in data stored in each block. This in turn provides an indication of the number of different mapping table pieces, which may correspond to the predetermine different logical address ranges, will need to be called and stored in RAM in order to determine validity of data in those blocks. As described above, in different implementations, the block address entropy information may be used to select source blocks for garbage collection that have lower block address entropy, or to route data to different block types during a data write, to take into account processing overhead in those and other operations.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A non-volatile memory system comprising:
   a non-volatile memory having a plurality of memory blocks; and
   a processor in communication with the non-volatile memory, the processor configured to:
      receive data from a host;
      store the received data in an open block in the non-volatile memory;
      update a logical block address (LBA) range data structure dedicated exclusively to the open block to identify one of a plurality of predetermined LBA ranges associated with the received data, wherein the processor is configured to update the LBA range data structure only when the LBA range of the received data contains data associated with a host LBA falling in one of the predetermined LBA ranges for a first time in the open block.

2. The non-volatile memory system of claim 1, wherein the processor is further configured to update a LBA data range counter each time data in a different LBA range of the predetermined plurality of LBA ranges is first received for the open block.

3. The non-volatile memory system of claim 1, wherein the processor is further configured to, upon completely filling the open block with received data, store the LBA data range counter in a block address entropy data structure, wherein the block address entropy data structure comprises respective LBA data range counters for closed blocks in the non-volatile memory.

4. The non-volatile memory system of claim 3, wherein each of the predetermined number of LBA ranges comprises a fixed number of LBAs.

5. The non-volatile memory system of claim 4, wherein each of the predetermined number of LBA ranges comprises a same number of LBAs.

6. The non-volatile memory system of claim 4, wherein the fixed number of LBAs corresponds to a logical address size of a piece of a mapping table for the non-volatile memory.

7. The non-volatile memory system of claim 3, wherein the processor is further configured to select a block for garbage collection based on both an amount of valid data and an LBA data range counter value of closed blocks in the non-volatile memory.

8. The non-volatile memory system of claim 7, wherein the processor is further configured to select a block for garbage collection that has a lowest LBA data range counter value among blocks having a same amount of valid data.

9. A non-volatile memory system comprising:
   a non-volatile memory having a plurality of blocks; and
   a processor in communication with the non-volatile memory, the processor configured to:
      receive data from a host;
      store the received data in an open block in the non-volatile memory;
      as the received data is stored in the open block, determine a block address entropy value for the open block, wherein the block address entropy value comprises a number of different of mapping address table pieces from a predetermined number of mapping address table pieces of a main mapping table that correspond to logical addresses of the received data in the open block; and
      upon fully programming the open block, storing the block address entropy value in an entropy value data structure, the entropy value data structure configured to store a respective block address entropy value for each fully programmed block in the non-volatile memory.

10. The non-volatile memory system of claim 9, further comprising a volatile memory in communication with the processor, the volatile memory configured to store only a portion of the mapping address table at one time.

11. The non-volatile memory system of claim 9, wherein each of the predetermined number of mapping table pieces is a same size.

12. The non-volatile memory system of claim 11, wherein the same size comprises a same number of logical block addresses.

13. The non-volatile memory system of claim 10, wherein to determine the block address entropy value for the open block, the processor is configured to generate a logical block address (LBA) range data structure in the volatile memory for the open block, wherein the LBA range data structure comprises a plurality of entries, each of the plurality of entries associated with a respective predetermined portion of a complete logical address range of the non-volatile memory system.

14. The non-volatile memory system of claim 13, wherein each of the plurality of entries corresponds to a LBA range of a different one of the predetermined number of mapping pieces.

15. The non-volatile memory system of claim 10, wherein the processor is further configured to generate a bit map for each open block in the non-volatile memory, the bit map having a predetermined number of entries each representing a logical address range of a different one of the predetermined mapping address table pieces, and to mark each entry of the predetermined number of entries corresponding to data written to a respective open block.

16. The non-volatile memory system of claim 9, wherein the non-volatile memory comprises a substrate formed with a three-dimensional memory structure.

17. A method of tracking block address entropy in a non-volatile memory system comprising:
    receiving data at a non-volatile memory having a plurality of blocks;
    storing the received data in a block of the plurality of blocks;
    marking logical ranges of the received data in predetermined logical range entries of a logical block address range data structure associated with the block, each predetermined logical range entry corresponding to a different piece of a mapping table for the non-volatile memory system;
    determining a block address entropy value for the block, wherein the block address entropy value comprises a sum of different predetermined logical range entries marked for the block in the logical block address range data structure; and in response to fully programming the block, storing the determined block address entropy value and deleting the logical block address range data structure associated with the block.

18. The method of claim 17, further comprising, in response to detecting a number of free blocks in the non-volatile memory falling below a predetermined threshold:

determining a source block for a garbage collection operation in the non-volatile memory based at least in part on block address entropy values for each fully programmed block of the non-volatile memory; and copying only valid data from the determined source block to an open block in the volatile memory.

19. The method of claim 17, wherein the plurality of blocks of the non-volatile memory comprise a first portion of blocks having a first block type and a second portion of blocks having a second block type, further comprising:

determining an average block address entropy value for all fully programmed blocks of the first block type; and when the average block address entropy value for all fully programmed blocks of the first block type is above a predetermined value, routing subsequently received data to blocks of the second block type in the non-volatile memory.

20. The method of claim 19, wherein the first block type is a single level cell (SLC) block type and the second block type is a multi-level cell (MLC) block type.

21. A non-volatile memory system comprising:

a non-volatile memory having a plurality of memory blocks; and means for receiving data from a host and storing the received data in an open block of the non-volatile memory; and means for storing logical block address (LBA) range data exclusively for the open block and for updating the LBA range data only when an LBA range of the received data contains data associated with a host LBA falling in one of a predetermined number of LBA ranges for a first time in the open block.

* * * * *